United States Patent Office 3,068,262
Patented Dec. 11, 1962

3,068,262
GERMICIDAL AND FUNGICIDAL COMPOSITIONS
Robert Feigin, Waterbury, Conn., assignor to Anderson Oil & Chemical Co., Inc., Portland, Conn., a corporation of Connecticut
No Drawing. Filed May 19, 1959, Ser. No. 814,143
1 Claim. (Cl. 260—438)

This invention relates to the preparation of a water soluble form of metal-containing germicides, fungicides and the like, which are normally insoluble in water.

Many germicides are fundamentally metallo organic compounds and are inherently insoluble in water, with the result that limitations on their usefulness as germicides appear, which are attributable to the fact that living things are based on water systems and the most effective poisons, therefore, are water soluble ones. As a rule, the water insoluble germicidal compositions are used in finely divided form, colloidal suspension or nonaqueous solutions.

It is a fundamental object of this invention to provide a modification of water insoluble germicidal compositions and fungicidal compositions such that the active ingredient is available in water solution, not only in substantially undiminished potency, but, frequently, in an enhanced degree of potency.

Other objects and advantages of the invention will, accordingly, in part be obvious and in part appear hereinafter.

More specifically, this invention is concerned with the solubilization of such germicides as metallo organic compounds, for example, copper 8-quinolinolate, which is a powerful fungistat and fungicide. In this specific instance, the organic portion of the molecule carries a functional group which is reactable with a water soluble amino acid to render the molecule water soluble without materially altering its other functional properties.

Copper 8-quinolinolate is a powerful fungistat and fungicide. It is practically insoluble in water and water-miscible solvents. If, to an alkaline solution of glycine salicylidene containing either a copper salt or 8-hydroxyquinoline, the other constituent of the fungicide is added, there is prepared a solubilized form of the material. The solution thus formed permits substantive absorption of the copper 8-quinolinolate by cellulose fabrics and wood. As a result, the aqueous composition formed is both germicidal and fungicidal. The alkalinity may be controlled so that the solution may be used for topical applications in the treatment of fungus infections. An aqueous solution containing 1000 parts per million or less of copper 8-quinolinolate, thus prepared, was found to cure severe cases of monilia infections in a matter of hours, or several days after one to four applications as required by the severity of the infection.

With respect to organic compounds useful as insecticides or fungicides, which compounds are not themselves soluble in water, salicylaldehyde is an example. It has long been known to be an effective sequestering agent germicide and algicide, but, however, because of its extremely low solubility, its use has been limited to nonaqueous applications or, to those where a very low concentration would suffice. The solubilization of the salicylaldehyde by reaction with water soluble amino acids, for example, glycine to form a water soluble salt thereof, renders the salicylaldehyde glycine reaction product not only water soluble, but actually enhances its effectiveness as a germicide to a considerable extent.

Accordingly, with other like compounds, as a general proposition, I have noted that any water insoluble organic compound, useful as a germicide, whether it be a pure organic compound or a metallo organic compound, may have its solubility increased by reaction with glycine salicylidene, to make it useful in water solutions.

What is claimed is:
A water soluble form of copper 8-quinolinolate, which consists essentially of the reaction product of copper 8-quinolinolate with glycine salicylidene formed in situ in the presence of said glycine salicylidene reaction product in amounts sufficient to render the copper 8-quinolinolate soluble in water.

References Cited in the file of this patent
UNITED STATES PATENTS
2,278,965    Van Peski et al. _____ Apr. 7, 1942
OTHER REFERENCES
Chem. and Eng. News, vol. 24, No. 7 (April 1946) p. 952.